(12) United States Patent
Kienzle et al.

(10) Patent No.: US 8,460,600 B2
(45) Date of Patent: *Jun. 11, 2013

(54) PROCESS FOR PRODUCING CERAMIC MATERIALS USING SILICON CARBIDE

(75) Inventors: Andreas Kienzle, Balgheim (DE); Johann Daimer, Mörfelden-Walldorf (DE)

(73) Assignee: Audi AG, Ingolstadt (DE)

( * ) Notice: Subject to any disclaimer, the term of this patent is extended or adjusted under 35 U.S.C. 154(b) by 616 days.

This patent is subject to a terminal disclaimer.

(21) Appl. No.: 11/802,008

(22) Filed: May 18, 2007

(65) Prior Publication Data

US 2007/0267777 A1    Nov. 22, 2007

(30) Foreign Application Priority Data

May 19, 2006  (DE) .......................... 10 2006 023 561

(51) Int. Cl.
*C04B 35/653*   (2006.01)
*C04B 35/565*   (2006.01)

(52) U.S. Cl.
USPC ........................................................ 264/682

(58) Field of Classification Search
USPC ........................................................ 264/682
See application file for complete search history.

(56) References Cited

U.S. PATENT DOCUMENTS

| | | | |
|---|---|---|---|
| 3,796,564 A * | 3/1974 | Taylor et al. | 264/29.1 |
| 4,649,002 A * | 3/1987 | Kim et al. | 264/434 |
| 6,030,913 A | 2/2000 | Heine et al. | |
| 6,245,424 B1 | 6/2001 | Lau et al. | |
| 6,386,341 B1 * | 5/2002 | Martin | 188/218 XL |
| 6,531,011 B2 * | 3/2003 | Gross et al. | 156/89.25 |
| 2003/0146059 A1 * | 8/2003 | Goller et al. | 188/218 XL |
| 2004/0238794 A1 * | 12/2004 | Karandikar et al. | 252/500 |

FOREIGN PATENT DOCUMENTS

| | | |
|---|---|---|
| EP | 0 245 192 A2 | 11/1987 |
| EP | 0 259 239 A1 | 3/1988 |
| EP | 0277085 A1 | 8/1988 |
| EP | 0378499 A1 | 7/1990 |
| EP | 0864548 A1 | 9/1998 |
| EP | 1 035 089 A1 | 9/2000 |
| EP | 1 059 274 A1 | 12/2000 |

* cited by examiner

*Primary Examiner* — Joseph S Del Sole
*Assistant Examiner* — Erin Snelting
(74) *Attorney, Agent, or Firm* — Novak Druce Connolly Bove + Quigg LLP

(57) ABSTRACT

Process for producing bodies from ceramic materials using silicon carbide, comprising the steps: configuration of fiber-reinforced porous bodies (1, 5) that consist of carbon on a base (2) that is inert relative to liquid silicon, the bodies having cavities (3) that are accessible from the exterior or surface recesses (3'), and the cavities (3) being closed at the bottom in the porous bodies or the surface recesses (3') together with the base (2) forming a reservoir that is sealed at the bottom; heating the configuration by introduction of energy to melt the silicon (6) that is present in the reservoir; and infiltrating the melted silicon in the bodies (1, 5) and reaction of the silicon with the carbon to form silicon carbide; and use of the thus produced bodies as brake disks and as clutch driving disks.

13 Claims, 2 Drawing Sheets

PROCESS FOR PRODUCING CERAMIC MATERIALS USING SILICON CARBIDE

Figure 1:
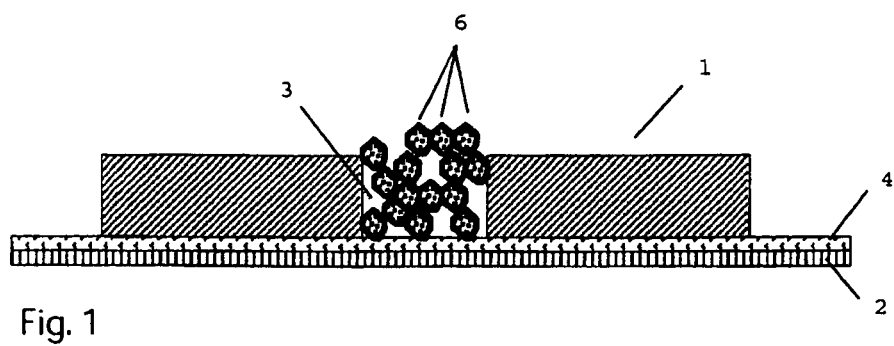

This application claims priority from German Application No. 102006023561.4, filed May 19, 2006, herein incorporated by reference in its entirety.

The invention relates to a process for producing ceramic materials using silicon carbide.

Ceramic materials using silicon carbide are produced, for example, through reaction of liquid silicon with carbon. Preference is given to use of porous molded bodies made of carbon (initial bodies) whose shape corresponds approximately to that of the molded body made of the ceramic material that is to be produced, in the so-called "near net shape process." In this case, those initial bodies are preferably used that are reinforced with fibers that are preferably made of carbon. The latter essentially are retained in the reaction of silicon with the carbon of the initial body matrix and so may continue to exert their reinforcing action. From the prior art, embodiments are known that ensure this retention of the reinforcing fibers through a special coating (DE 197 10 105 A1).

The reaction of the liquid silicon with the initial body usually is carried out so that the silicon, together with the initial body, is heated to the point of melting, the silicon flowing into the initial body, rising and falling as a result of the capillary action, through immersion or through flowing out of applied silicon particles or bodies, which may also be suitably bound.

A fundamental problem here is in a batch operation, the heating and cooling of the workpieces (initial bodies and siliconized molded bodies) up to the melting point of the silicon at about 1420° C. and the subsequent cooling to room temperature for post-treatment and further processing. When liquid silicon is introduced into the initial body by way of wicks, the limited wick support surface results in slow penetration of the liquid silicon and therefore a long reaction period. During the long reaction period, undesirable secondary reactions are also promoted, of course, in particular the attack of liquid silicon on the carbon reinforcing fibers. In addition, it is necessary to retain a larger amount of silicon in the melting vessels than is actually required for infiltration and reaction. The melting vessels (crucibles) must be resistant to liquid silicon over a long period; the protective coating required (for example with boron nitride or through lining with graphite foil, which in turn is coated with boron nitride) is time-consuming and therefore costly. Cleaning of the crucibles after use and before further use of the by-products and wastes formed over an extended dwell time is also time-consuming.

There is therefore a need for a process for producing ceramic materials using silicon carbide, a process in which the introduction of the required silicon is possible in a simpler way and with less expense.

The invention makes available a process in which fiber-reinforced porous bodies that are made of carbon are configured on a base that is inert to liquid silicon, and the bodies have cavities accessible from the exterior or surface recesses, for example in concave form. It is essential for the invention that the cavities in the porous bodies be closed at the bottom or form such a space—that is sealed at the bottom—with the base, which in addition, together with the surface recesses, is referred to as a reservoir, and that may include this reservoir or a quantity of silicon that is sufficient for the formation of the ceramic material by reaction of the carbon with the silicon. But it is also possible, according to the invention, to conduct the described process in several stages, after the reaction of the first "filling," i.e., the first quantity of silicon, the reservoir being filled with silicon at least one additional time, and the reaction being continued.

The configuration is heated to the point of melting the silicon that is present in the reservoir by the introduction of energy. The melted silicon penetrates into the porous bodies—this process is referred to as infiltration—and reacts with the carbon in the porous bodies to form silicon carbide. The heating of the configuration is carried out advantageously through inductive heating or through radiant heating.

When the silicon in the reservoir is melted, the melted silicon penetrates the entire contact surface in the porous bodies; this results in substantially shorter reaction periods.

By preference the base of the configuration preferably consists of graphite or a graphite sheet. A layer may be provided on the graphite or the graphite sheet as a releasing agent; boron nitride is preferred as a releasing agent.

Studies conducted on the basis of this invention have shown that, as a result of the shorter reaction period, the attack of the liquid silicon on the carbon reinforcing fibers may be considerably reduced or entirely eliminated, so that a special fiber protection through coating may be reduced or entirely dispensed with. In addition to the larger contact surface and the resulting faster penetration of the silicon in the carbon body, the studies also show that the reduction of the attack on the fibers is also produced by the shorter heating period.

It is therefore essential for the invention that the silicon not be retained, for example, by a surface coating of particles or a compact piece after the melting and be able to penetrate the carbon body only after a period of delay, as described in the application DE 198 50 468 A1; rather, it is preferable that the melted silicon be able to penetrate the carbon body as quickly as possible.

In the production of brake disk rings that consist of ceramic materials using silicon carbide, the cylinder ring itself can act as a reservoir in association with the base. Possible contamination by a releasing agent, which is used as a layer on the base, on the surfaces of the brake disk rings, which act as a friction surface, may be avoided if brake disk rings with a molded-on pot of the same or a similar ceramic material are used. In this case, the pot may serve as a reservoir; the type of base of the brake disk with the bottom of the pot on the base ensures that the portions of the brake disk later acting as friction surfaces do not come into contact with the base and therefore with the releasing agent layer present thereon, preferably a boron nitride layer. The molded-on pot preferably serves to fasten the brake disk on the hub of the vehicle. In this case, the carbon porous body is in the form of a sheath layer of a truncated cone with a cylindrical disk mounted on the exterior of the base and a cover disk on the upper truncated end of the truncated cone, and the cover disk preferably has a central recess in the form of a hollow cylinder.

The bodies produced in this way from the ceramic materials are preferably used as friction disks, in particular for brake disks and clutch driving disks.

The process may thus be implemented as a continuous process, and in particular the low thermal inertia advantageously influences the controllability of the process by limiting the masses that are to be heated and cooled. It is also possible, however, to run this siliconizing process as a "batch" process.

The process will be explained by the accompanying drawings, of which

Figure 2:
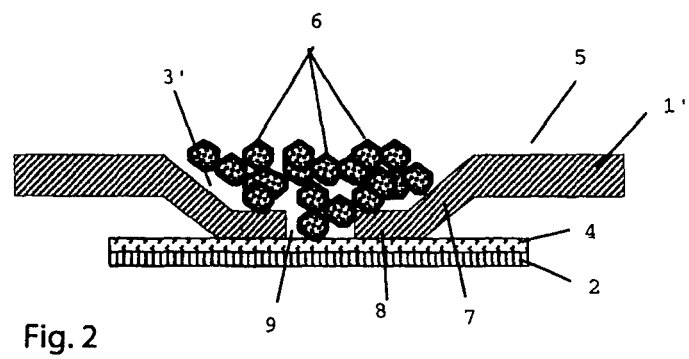

FIG. 1 shows a cross-section through a cylindrical porous carbon body 1, which, in contact with a base 2, which is provided with a layer 4 that consists of boron nitride, forms a reservoir 3, in which an amount of silicon in the form of particles 6 that is sufficient for reaction or a compact body is contained, and FIG. 2 shows a cross-section through a porous initial body 5 that consists of carbon for a carbon-ceramic brake disk with a molded-on pot body 5' on a base 2 as shown in FIG. 1, and Si particles 6 are also contained in the reservoir 3 that is formed from the pot body.

In the illustrated embodiments, silicon is received over the entire interior jacket surface of the cylinder ring (FIG. 1) or over the interior surface of the basin-shaped reservoir that is shown in FIG. 2.

Heating of the configuration shown in FIG. 1 is preferably effected by introduction of energy into the base 2 or especially preferably into the porous carbon body 1 itself; this may be accomplished by, for example, induction of turbulence or by radiation.

In the process, in the bed of the particles 6, the silicon melts into the reservoir 3 that is formed from the cavity in contact with the base 2 and penetrates into the porous carbon body 1 through the inside jacket surface of the cylinder ring. The carbon in the body 1 reacts with the penetrated silicon with the formation of silicon carbide. The coating of the base 2 with a layer 4 that consists of boron nitride in this case brings about that after the cooling of the body that is glazed through reaction to form silicon carbide, it can be dissolved easily from the base 2.

In the same way, the configuration that is shown in FIG. 2 is heated, and here, a more porous body that consists of carbon 5 is used, which in the center has a molded-on pot in the form of a jacket surface 7 and the cover surface 8 of a truncated cone. In the center of the cover surface 8, there is a recess 9 with a circular cross-section that forms a hollow cylinder. The silicon that is present in the reservoir 3 that is formed in the form of a recess that is open at the top may penetrate the body 5 in this embodiment after melting over a surface that is larger in comparison to FIG. 1. The part 1' of the body, corresponding to the friction in the brake disk area exposed during braking, may not come into contact here with the boron nitride of layer 4; avoiding contamination with boron nitride is desired for the friction layer of a brake disk.

The effect is illustrated through the following examples:

EXAMPLE 1

Molded Bodies with Threefold Fiber Protection

A prepreg (impregnated fabric) was produced from a fabric of carbon multifilaments (3 K rovings, i.e., 3000 individual carbon filaments with a surface area-related mass of about 240 g/m$^2$) by impregnation by an aqeous resol. Excess phenol resin was removed by pressing. The fabric was cut into laminar structures of about 500 mm in diameter, and the latter were stiffened with intermediate layers of siliconized paper at about 140° C. in a press under a pressure of about 5 MPa for three hours.

The pressed and stiffened stacks of impregnated fabrics were then carbonized in a furnace under nitrogen as a cover gas at a temperature of up to 900° C. In the process it was heated at a rate of about 4 K/h from 300° C. up to 600° C. to achieve uniform carbonization. After cooling, also under cover gas, the carbonized fabric plates were impregnated again with a phenol resin (Novolak, Bakelite IT 491®), dried and in turn carbonized under cover gas for about 8 hours at 950° C. After cooling to room temperature, it was impregnated again, this time with tar pitch with a softening temperature of about 60° C. according to DIN [German Industrial Standard] 52025. The impregnated fabric plates were carbonized again at about 950° C. for about eight hours. Then, the plates were heated under cover gas to 2200° C., left at this temperature for twenty minutes, and ground in a fly cutter mill with a 5 mm sieve insert after cooling.

The ground material (2,750 g) was then mixed with a mixture that consists of 1,500 g of a phenol resin (resol, Norsophen 1203®, Bakelite Company) and 450 g of a ground (maximum particle size 20 μm) of coal-tar pitch with a softening temperature of 230° C. according to DIN 52025 at room temperature (23° C.) in a Z-arm kneader. The homogenized mixture was completely hardened in a mold in a heatable press at 1.5 MPa (15 bar) and a temperature of 150° C. for two hours. The hardened molded body was removed and carbonized as above at 900° C.

EXAMPLE 2

Molded Bodies with Simple Fiber Protection

A prepreg (impregnated fabric) was produced from a fabric of carbon multifilaments (3 K rovings, i.e., 3000 individual carbon filaments with a surface-area-related mass of about 240 g/m$^2$) produced by impregnation with an aqueous resol. Excess phenol resin was removed by pressing. The fabric was cut into laminar structures of about 500 mm in diameter, and the latter were hardened with intermediate layers of siliconized paper at about 140° C. in a press under a pressure of about 5 MPa for three hours. The hardened material was ground in a fly cutter mill with a 5 mm sieve insert.

The ground material (2,750 g) was then mixed with a mixture of 1,500 g of a phenol resin (resol, Norsophen 1203®, Bakelite Company) and 450 g of a ground (maximum particle size of 20 μm) coal-tar pitch with a softening temperature of 230° C. according to DIN 52025 at room temperature (23° C.) in a Z-arm kneader. The homogenized mixture was completely hardened in a mold in a heatable press at 1.5 MPa (15 bar) and a temperature of 150° C. for two hours. The hardened molded body was removed and carbonized as above at 900° C.

EXAMPLE 3

Siliconization of the Molded Bodies

In each case, 3 molded bodies in the form of cylindrical disks at a height of 36 mm, an inside diameter of 155 mm and an outside diameter of 380 mm, which had been produced according to Examples 1 and 2,
  a) were applied according to the conventional way (siliconization by attaching the molded body to the wicks that consist of porous carbon material, which are in contact with a bath that consists of liquid silicon, heating rate of 10 K/minute, holding time of 30 minutes, temperature about 1600° C., vacuum), and
  b) according to the invention, by the cylindrical ring disks being placed on quadratic graphite plates with an edge length of 450 mm and a boron nitride coating with a thickness of about 0.1 mm, the empty space in the center of the cylindrical ring was filled with silicon granulate (diameter range about 0.5 mm to 4 mm), and this configuration was heated in an evacuated induction furnace to 1600° C. during a period of about 4.2 minutes; the temperature was held for another two minutes.

The differently treated molded bodies were cooled; they were completely siliconized according to the selected time, i.e., the remaining percentage by mass of matrix-carbon in the sample was less than 7%.

In these molded bodies, the proportion of carbon fibers that were not attacked in the infiltration with silicon was then determined. In this case, the following was produced as a mean value via the molded bodies examined:

|  | a) Wicking process | b) According to the invention |
|---|---|---|
| Molded bodies according to Example 1 | 95.1% | 96.4% |
| Molded bodies according to Example 2 | 52.0% | 95.3% |

LIST OF REFERENCE NUMERALS

| 1 | Cylindrical porous carbon bodies |
|---|---|
| 1' | Cylindrical part of the porous carbon bodies 5 |
| 2 | Base |
| 3 | Cavity as reservoir |
| 3' | Recess open at the top as a reservoir |
| 4 | Boron nitride layer |
| 5 | Porous body that consists of carbon |
| 6 | Silicon |
| 7 | Jacket surface |
| 8 | Cover surface |
| 9 | Recess with circular cross-section |

The invention claimed is:

1. A process for producing a ceramic article comprising:
providing a base member formed of a material nonreactant with molten silicon:
configuring a carbon fiber, porous body provided with an opening therethrough;
positioning said body on said base member so that the opening of said body cooperates with a portion of said base member to form a reservoir within said body;
depositing silicon particles in said reservoir; and
applying heat to melt said silicon particles and cause molten silicon to infiltrate said porous body and react with said carbon fibers to form silicon carbide.

2. A process according to claim 1 wherein said base member is formed of a graphite material.

3. A process according to claim 1 including interposing a releasing layer between said base member and said porous body.

4. A process according to claim 3, wherein the releasing layer comprises boron nitride.

5. A process according to claim 1 wherein said heating is performed by induction heating.

6. A process according to claim 1 wherein said heating is performed by radiant heating.

7. A process according to claim 1 wherein at least a portion of a side wall of the opening in said porous body is disposed at other than a right angle to said base member when said porous body is positioned on said base member for increasing the surface area of the porous body to enhance infiltration of molten silicon.

8. A process according to claim 7 wherein said opening in said porous body is configured so that it cooperates with said base member to provide a reservoir having a truncated cone configuration.

9. A process according to claim 1 including configuring said ceramic article as a friction disk.

10. A process according to claim 1 including configuring said ceramic article as a brake disk.

11. A process according to claim 1 including configuring said ceramic article as clutch disk.

12. A process according to claim 1 wherein said opening configured in said carbon fiber, porous body constitutes a through, unobstructed opening.

13. A process according to claim 1 wherein said opening configured in said carbon fiber body comprises an opening forming a reservoir having a bottom formed of said base member and the side thereof formed of said carbon fiber, porous body.

* * * * *